United States Patent
Lundstrom

[11] Patent Number: 6,065,784
[45] Date of Patent: May 23, 2000

[54] PIPE JOINT RESTRAINT RING WITH MULTIPLE INSIDE RADII

[75] Inventor: Michael L. Lundstrom, Eastland, Tex.

[73] Assignee: EBAA Iron, Inc., Eastland, Tex.

[21] Appl. No.: 09/096,881

[22] Filed: Jun. 12, 1998

[51] Int. Cl.[7] .............................................. F16L 23/032
[52] U.S. Cl. ......................... 285/368; 285/413; 285/415
[58] Field of Search ................................. 285/368, 412, 285/413, 415, 414

[56] References Cited

U.S. PATENT DOCUMENTS

| 406,272 | 7/1889 | Euvrard | 285/415 |
|---|---|---|---|
| 3,515,416 | 6/1970 | Pickert | 285/413 |
| 4,113,829 | 9/1978 | Bowker et al. | 264/295 |
| 4,366,959 | 1/1983 | Roche | 285/368 |
| 4,519,639 | 5/1985 | Florian | 285/415 |
| 4,568,112 | 2/1986 | Bradley et al. | 285/238 |
| 4,896,903 | 1/1990 | Shumard | 285/337 |
| 5,073,353 | 12/1991 | Florian | 285/415 |
| 5,209,524 | 5/1993 | Corwon et al. | 285/114 |
| 5,314,215 | 5/1994 | Weinhold | 285/283 |
| 5,464,257 | 11/1995 | Riddles et al. | 285/156 |
| 5,509,699 | 4/1996 | Himmelberger | 285/337 |
| 5,547,231 | 8/1996 | Sharp | 285/133 |
| 5,755,466 | 5/1998 | Harth | 285/415 |

FOREIGN PATENT DOCUMENTS

| 974018 | 11/1982 | Russian Federation | 285/414 |
|---|---|---|---|
| 450187 | 7/1936 | United Kingdom | 285/368 |
| 631447 | 11/1949 | United Kingdom | 285/412 |
| 2242719 | 10/1991 | United Kingdom | 285/368 |

*Primary Examiner*—Dave W. Arola
*Attorney, Agent, or Firm*—Akin, Gump, Strauss, Hauer & Feld, LLP

[57] ABSTRACT

A backup ring for a pipe joint restraint includes a continuous one piece ring member or opposed ring segments, both including multiple inside radii to provide a portion of the ring which may be secured to a pipe fitting and a portion of the ring which is adapted to provide clearance for reinforced areas of a pipe fitting, such as a fillet reinforcement at a branch portion of a tee fitting. The ring embodiments with multiple ring segments include opposed radially projecting ears with fastener receiving bores and radially projecting lugs adapted to provide for connecting the ring assembly to a second ring assembly or gland clamped to the pipe section which is to be restrained in connection with the pipe fitting to which the backup ring assembly is clamped. The circumferential extent of the ring segments is preferably less than 180° to accommodate a range of pipe fitting diameters with a single size ring segment.

22 Claims, 5 Drawing Sheets

PIPE JOINT RESTRAINT RING WITH MULTIPLE INSIDE RADII

FIELD OF THE INVENTION

The present invention pertains to a backup ring for a pipe joint restraint assembly having multiple inside radii to accommodate pipe fittings with fitting branch reinforcement fillets or gussets.

BACKGROUND

Pipe joint restraints are widely used for securing one section of pipe to a fitting, such as a tee or elbow, for example. Generally, prior art pipe joint restraint assemblies comprise two ring or gland members which may be multi-segment members and which are secured, respectively, to interconnected sections of pipe or to a section of pipe or spigot and to the pipe fitting. The restraint assemblies are usually interconnected by plural tie-rods or bolts to prevent the joint from separating due to internal fluid pressure differentials or other mechanical forces acting on the piping system. Plastic pipe and pipe fittings have been developed in recent years for a wide variety of piping applications and the development of plastic, particularly polyvinylchloride (PVC), pipe fittings has evolved to meet certain high pressure piping requirements.

The continued development of PVC pipe and pipe fittings, as well as metal pipe and fittings, has required fitting configurations wherein tees, crosses and similar fittings, for example, which have intersecting conduit portions or branches have, particularly for high pressure applications, required reinforcement of the fittings at the intersections of the respective conduit branches. These reinforcements have typically been made in the form of integral molded fillet areas at the intersections of the conduit branches which may be circumferential or comprised spaced apart fillet or gusset-like segments. In any case, the changes in the configuration of such pipe fittings has caused certain problems in applying pipe restraining ring assemblies, to the fittings.

For example, conventional restraining rings, glands or so called backup rings for pipe joint restraint assemblies are typically sized for a particular outside diameter or a limited range of outside diameters of the pipe and pipe fitting bell portion. If larger diameter restraining rings or backup rings are used with the pipe fittings which have the filleted or reinforced conduit branch intersections, these rings are poorly fitted to the pipe joint, are subject to failure or simply do not provide enough interference between the edge of the ring and the pipe or fitting bell collar to provide a suitable restraint. However, the present invention overcomes the problems associated with pipe joint restraints for use with various pipe and pipe fittings having branch conduit intersections which are reinforced by a continuous fillet or by spaced apart fillet segments between the respective branches.

SUMMARY OF THE INVENTION

The present invention provides an improved, backup ring for a pipe joint restraint assembly adapted to accommodate reinforced pipe fittings, particularly pipe fittings formed of plastic, such as PVC, as well as fittings formed of other materials.

In accordance with one aspect of the present invention a pipe joint restraint ring is provided which has multiple inside radii to provide clearance for reinforced areas of a pipe joint or fitting member and to also provide a suitable portion of the ring which is adapted to forcibly engage the remainder of the fitting, such as a so-called bell portion of a fitting.

The improved pipe joint restraint ring or backup ring of the present invention is preferably formed as an integral member or in two or more segments, which may be identical for a certain range of pipe diameters or the ring segments may be of slightly different configurations with respect to the number of tie-rod or tie-bolt lugs provided thereon. The joint restraint members or backup rings of the present invention are preferably configured to provide for engagement with the bell portion of a pipe fitting over approximately 50% to 75% of the circumference of the ring while the remaining portion of the ring provides clearance for reinforced areas of pipe fittings to which the ring is applied.

In accordance with another aspect of the present invention, a multi-segment, multi-radius joint restraint member or backup ring assembly is provided. The ring segments may be configured in different ways for interconnection to each other. In particular, a multi-segment backup ring may be adapted to be used with pipe fittings of various diameters. In this regard each ring segment may be provided with opposed flanges or ears for receiving a bolt and nut assembly to secure the ring segments to each other. The ears are dimensioned such that a gap is provided between ears of adjacent segments which are secured to each other and so that the ring assembly may be used with pipe fittings of different diameters. In this way a particular backup ring assembly may be used with multiple sizes of pipe joints or fitting structures. The backup ring segments are preferably formed of cast or forged metal, such as ductile iron or steel and the like. Moreover, the joint restraint members or backup rings are adapted to be used with conventional joint restraint members connected to a section of pipe or spigot which is being joined to the fitting to which the backup ring is connected.

Those skilled in the art will further appreciate the above-mentioned features of the invention together with other important aspects thereof upon reading the detailed description which follows in conjunction with the drawings.

BRIEF DESCRIPTION OF THE DRAWING

FIG. 3A is a detail section view taken along line 3A—3A of FIG. 3;

DETAILED DESCRIPTION OF THE PREFERRED EMBODIMENTS

Figure 1:
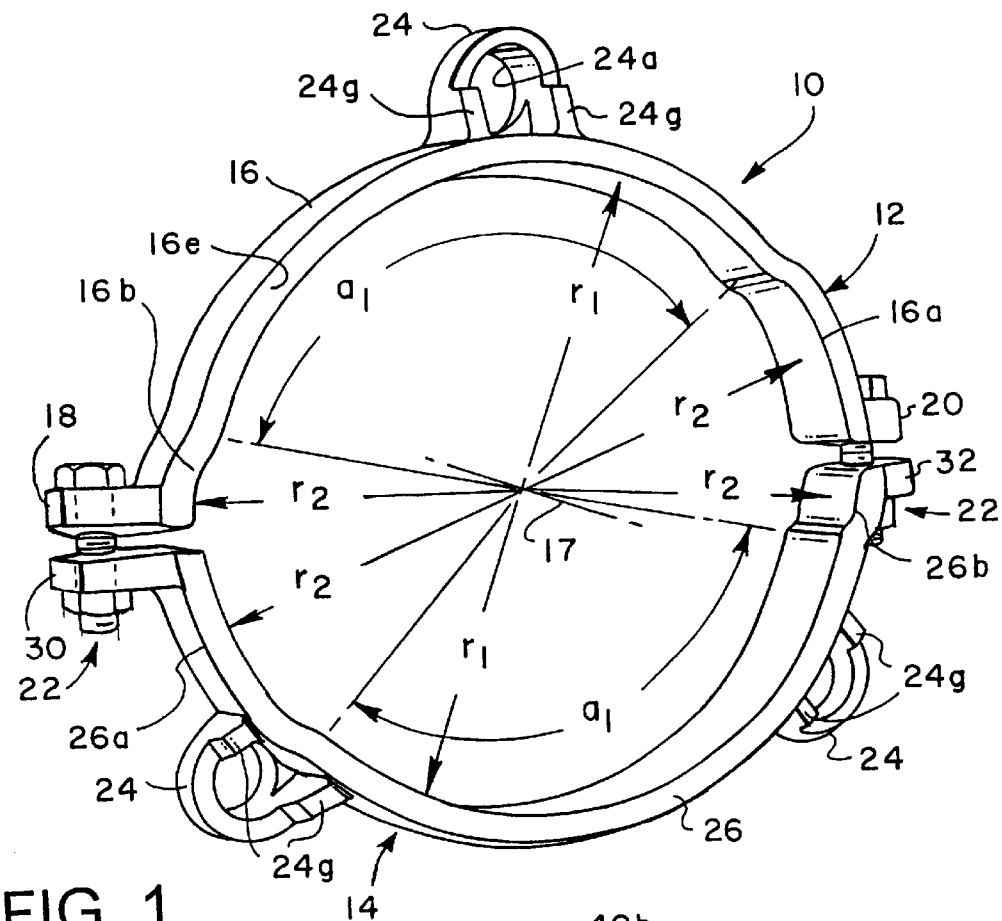
FIG. 1 is a perspective view of one embodiment of a pipe joint restraint member or so called backup ring assembly in accordance with the present invention.

In the description which follows like parts are marked throughout the specification and drawing with the same reference numerals, respectively. The drawing Figures are not necessarily to scale and certain features may be shown exaggerated in scale in the interest of clarity and conciseness.

Referring to FIG. 1, there is illustrated a pipe joint restraint member in accordance with the invention comprising a multi-segment backup ring assembly, generally designated by the numeral 10. The backup ring assembly 10 includes two opposed, generally semi-circular ring segments 12 and 14 which are cooperable to form a backup ring assembly, as shown. The ring segment 12 is characterized by an annular ring part 16 having an inner or inside radius $r_1$, with respect to a central axis 17, which extends over a circular arc $a_1$ which is approximately 50% to 75% of the circumferential extent of the segment 12. The remainder of the ring part 16 of the ring segment 12 has an inside radius $r_2$ and is provided in two portions 16a and 16b wherein the circumferential extent of the portion 16a is preferably about four to five times the circumferential extent of the portion 16b. The ring segment 12 is also provided with two radially projecting opposed flanges or ears 18 and 20 which are provided with suitable bores operable to receive respective bolt and nut assemblies 22 for securing the ring segments 12 and 14 to each other. The radii $r_1$ and $r_2$ are not required to be constant and multiple linear portions of the inside surfaces of the ring segments could be provided to approximate the radii $r_1$ and $r_2$ and provide the requisite clearances.

In the embodiment of FIG. 1, the ring assembly 10 is adapted for use with intermediate size pipe fittings for nominal U.S. standard pipe diameters from about four inches to eight inches. In this regard, the ring segment 12 is provided with one radially extending lug 24 for receiving a tie-rod or bolt, not shown in FIG. 1, for securing the ring assembly 10 to a pipe joint restraint member to be described further herein. The lug 24 is suitably spaced on the ring part 16 about midway between the ears 18 and 20.

Referring further to FIG. 1, the ring segment 14 is configured similar in some respects to ring segment 12 in that it is provided with a circular ring part 26 having two spaced apart portions 26a and 26b which also have an inside radius $r_2$ with respect to the axis 17 and an inside radius of a major portion of the ring part between the portions 26a and 26b having the smaller inner radius $r_1$, the circumferential extent of which is preferably the same, over an arc $a_1$, as the ring segment 12. The ring segment 14 is also provided with opposed ears 30 and 32 which are cooperable with a bolt assembly 22 and the ears 18 and 20 to secure the ring segments to each other for clamping the ring assembly over a pipe fitting as will be described further herein. The ring segment 14 is also provided with two radially outwardly projecting tie-rod support lugs 24 spaced apart approximately 120° from each other and spaced from the respective ears 30 and 32 approximately the same circumferential distance.

Figure 2:
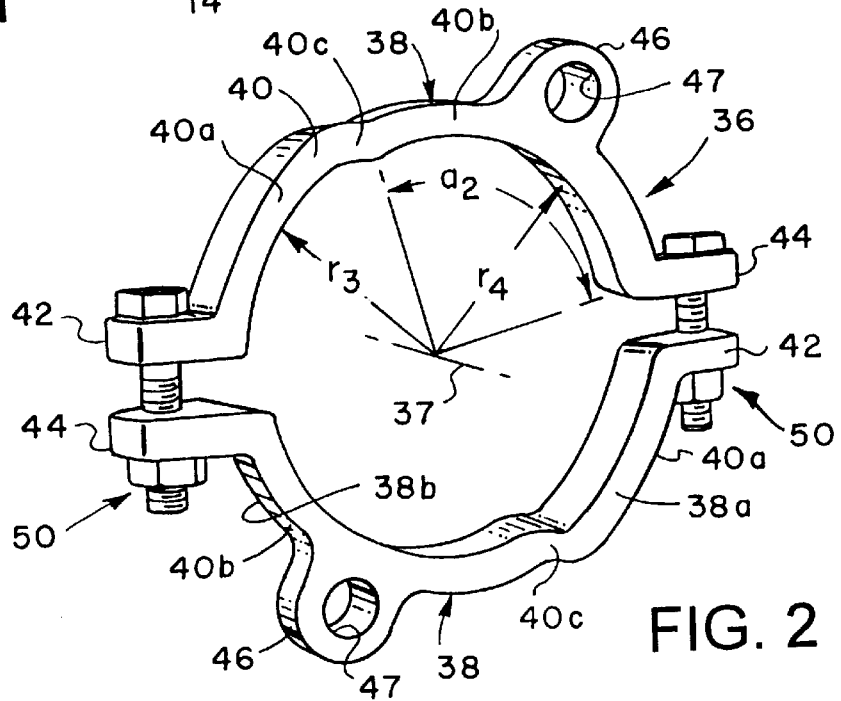
FIG. 2 is a perspective view of a first alternate embodiment of a pipe joint restraint member or backup ring assembly in accordance with the invention.

Referring now to FIG. 2, an alternate embodiment of a pipe joint restraint backup ring assembly is illustrated and generally designated by the numeral 36. The backup ring assembly 36 is characterized by two opposed ring segments 38 which are each of identical construction and comprise a substantially semi-circular annular ring part 40 delimited at its opposite ends by radially projecting ears 42 and 44. The ring part 40 is provided in two portions including a portion 40a having an inside radius $r_3$ greater than an inside radius $r_4$ of a portion 40b of the ring part 40. The circumferential extent of the ring portion 40b having the smaller inner radius $r_4$ is indicated at arc $a_2$ and is approximately 50% to 75% of the total circumferential extent of the ring segment 38. The ring segment 38 includes a radially projecting lug 46 projecting from the ring portion 40b of smaller inner and outer radius and circumferentially offset between the ears 42 and 44, but disposed about midway between the ear 44 and the transition area 40c between the ring portions 40a and 40b. Lug 46 includes an axial bore 47 extending therethrough and parallel the central axis 37 of the backup ring assembly 36 for receiving a tie-rod or tie-bolt to be described in further detail herein for connecting the ring assembly 36 to a pipe joint restraint gland assembly and the like. The ring assembly 36 is suitably releasably assembled by cooperating conventional hexhead bolt and nut assemblies 50 which project through cooperating bores in the ears 42 and 44. It will be noted in FIG. 2 that the lugs 46 extend axially from one transverse face 38a of the ring segment 38 to the opposite transverse face 38b which is parallel to face 38a. Accordingly, a backup ring assembly 36 may utilize two ring segments 38 to provide the assembly and does not require separate ring segments as may be required of the assembly 10. Typically, the backup ring assembly 36 is for relatively smaller diameter pipes, under four inches, for example, and requiring only two tie-rods or tie-bolts between the backup ring assembly 36 and a joint restraint gland assembly.

Figure 3:
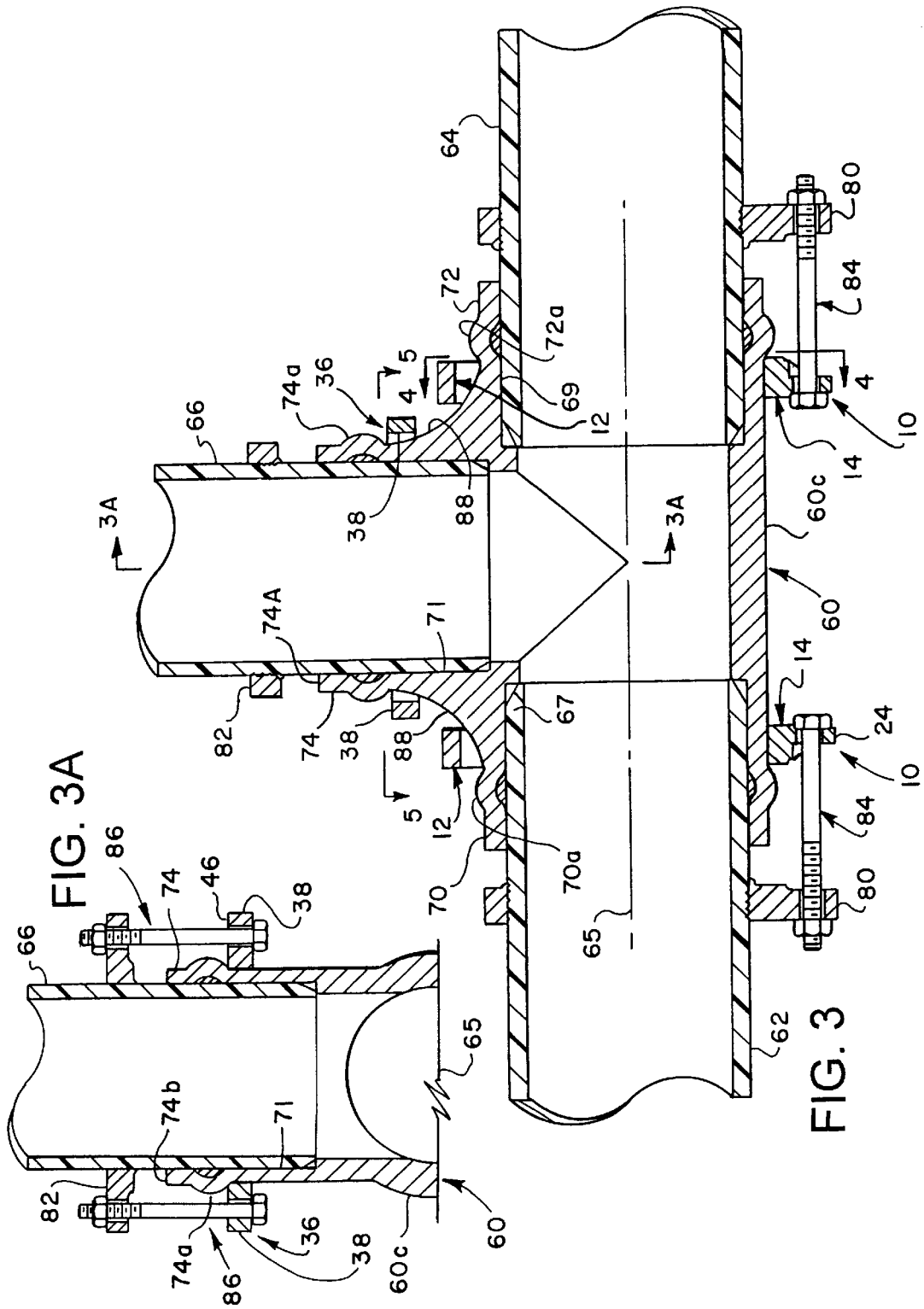
FIG. 3 is a longitudinal central section view taken through a tee pipe fitting showing joint restraint assemblies which include the backup rings of the embodiments of FIG. 1 and FIG. 2, respectively, applied thereon.

Referring now to FIG. 3, there is illustrated, in longitudinal central section, a pipe tee fitting 60, for example, which utilizes two backup ring assemblies 10 and one backup ring assembly 36 see FIG. 3A also, to provide pipe joint restraints between the tee fitting and a main or straight run of pipe including pipe sections 62 and 64 and a branch run-including a pipe section 66 extending normal to the axis 65 of the run formed by the pipe sections 62 and 64. The pipe sections 62 and 64 are straight pipe sections, sometimes called spigots, which fit into counterbores 67 and 69, respectively, formed in opposed coaxially aligned bell portions 70 and 72 of the fitting 60. The pipe section 66 fits within a counterbore 71 in a bell portion 74 extending substantially normal to the axis 65. Each of the bell portions 70, 72 and 74 includes a circumferential, radially outwardly extending integral collar 70a, 72a and 74a, respectively, forming structure for engagement with the backup ring assemblies 10 and 36, respectively, as shown.

Each of the backup ring assemblies 10 and 36 forms a pipe joint restraint with a cooperating pipe joint restraint member which may be a gland or similar structure such as described in U.S. Pat. No. 4,568,112 issued Feb. 4, 1986 to E. C. Bradley, Jr. et al. and assigned to the assignee of the present invention. The entire disclosure of U.S. Pat. No. 4,568,112 is incorporated herein by reference. Pipe joint gland assemblies 80 and 82 are suitably clamped to the pipe sections 62, 64 and 66, respectively, in accordance with the teaching of U.S. Pat. No. 4,568,112 and each gland 80 is connected to a backup ring assembly 10 by respective elongated conventional hex head bolt and nut assemblies 84, one shown for each pipe joint restraint in FIG. 3. Bolt and nut assemblies 86 interconnect the gland assembly 82 with the backup ring assembly 36, FIG. 3A. The bolt and nut assemblies 84 have been rotated into the plane of FIG. 3 for purposes of illustration only. It will be noted from drawing FIGS. 4 and 5 that the bolt and nut assemblies 84 and 86 may not necessarily be aligned with a plane intersecting the tee fitting 60, as shown in FIG. 3.

Figure 4:
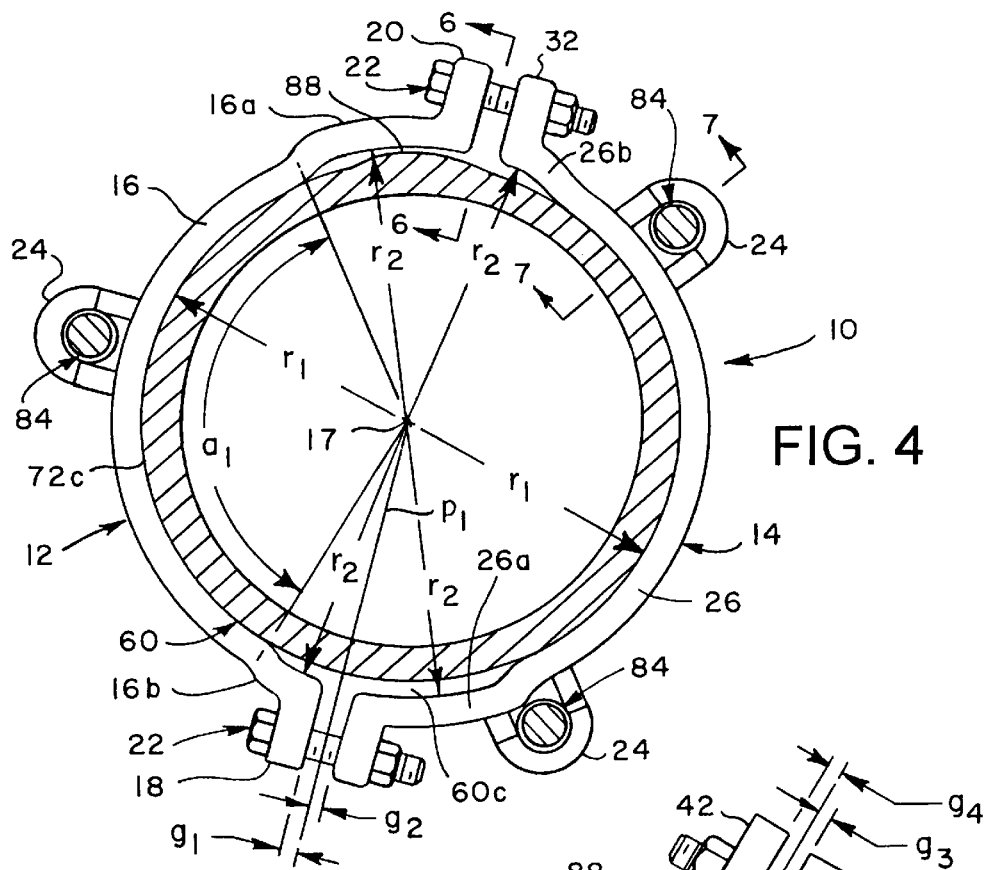
FIG. 4 is section view taken generally from the line 4—4 of FIG. 3.
Figure 5:
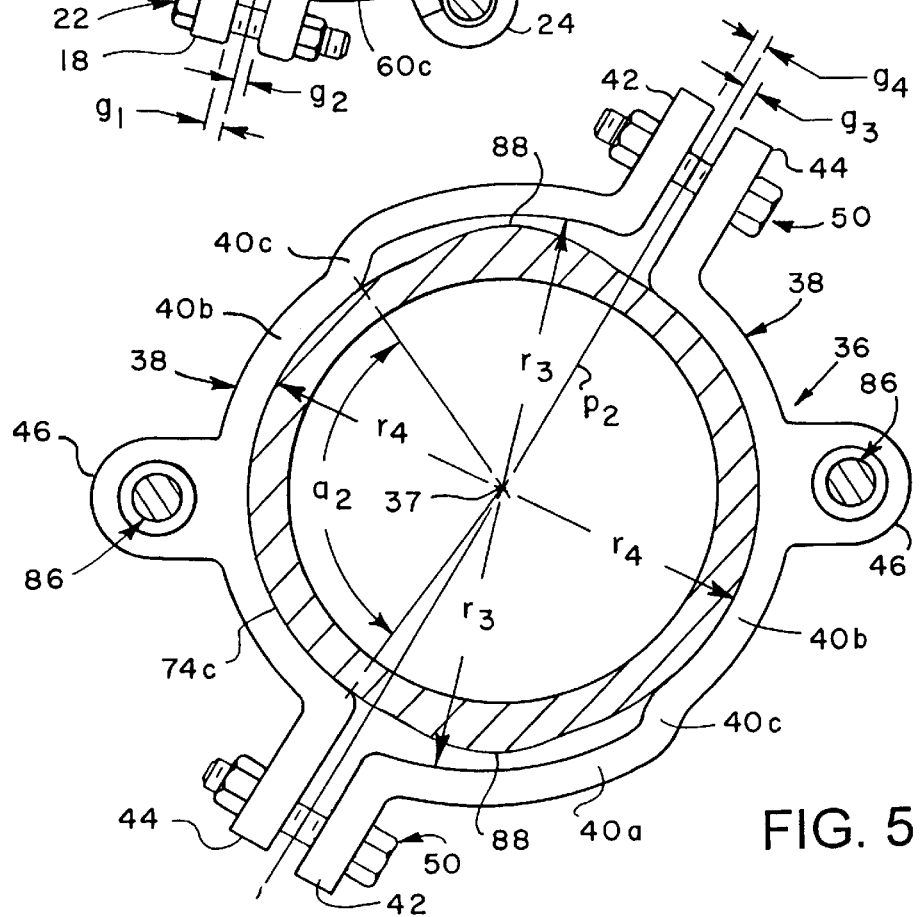
FIG. 5 is a section view taken generally from the line 5—5 of FIG. 3.

Referring further to FIGS. 3 and 3A, as well as FIGS. 4 and 5, part of the bell portion 74 of tee fitting 60 which supports the pipe section 66 is of a larger diameter with respect to the portion at the distal end 74b so as to form a reinforced filleted area 88 about the circumference of the bell portion 74 at its juncture with a cylindrical body portion 60c of the fitting 60 and which includes the bell portions 70 and 72. This is in contrast with pipe fittings wherein each of the pipe branches is essentially the same diameter and there is no enlargement to reinforce the junction between the branches. The enlarged reinforcement or fillet area 88 may be substantially continuous about the circumference of the bell portion 74 at its intersection with the cylindrical body 60c which forms the main continuous run of the tee fitting 60. Alternatively, the filleted reinforcement area 88 may be a plurality of circumferentially spaced radially projecting thin walled gussetlike portions extending between the bell portion 74 and the body 60c.

As a consequence of the continuously varying enlarged diameter of the reinforcement area 88, as shown in FIGS. 3, 4, and 5, the backup ring assemblies 10 and 36 may still be forcibly and uniformly engaged with the bell portions 70, 72 and 74 thanks to the configuration of the respective ring segments 12, 14 and 38. For example, with regard to the backup ring assembly 10, the ring segments 12 and 14 may be forcibly clamped to the outside circumferential surface 72c of the bell portion 72 over the circumferential extent of the ring parts 16 and 26 which have an inside radius $r_1$. Alternatively, the ring segments 12 and 14 are at least drawn together by the bolt assemblies 22 sufficiently that in any event, when the tie rod or bolt and nut assemblies 84 are tightened the ring assemblies 10 are forcibly engaged with the circumferential collars 70a and 72a of the bell portions 70 and 72 while the cooperating ring parts 16a and 26b, for example, provide clearance for the reinforcement or filleted area 88. Accordingly, the backup ring assemblies 10 are restrained by the collars 70a and 72a to prevent unwanted disconnection of the pipe sections 62 and 64 from the tee fitting 60 while clearance is provided at the area 88.

Although the ring portions 26a and 16b are not required to provide clearance in the arrangement illustrated in the drawing Figures, those skilled in the art will recognize that a ring assembly 10 utilizing the rings segments 12 and 14, or a ring assembly utilizing two ring segments 12, or two ring segments 14 may be used on a branch part of a fitting having a reinforcement area projecting in opposite directions, as shown in FIG. 5, for example. Another advantage of the backup ring assembly 10 is illustrated in FIG. 4 wherein it is noted that the circumferential extent of the ring parts 16 and 26, including the ring portions 16a and 16b and the ring portions 26a and 26b, does not extend entirely through 180° or a true semi-circle. In this regard, the flanges or ears 18 and 20 of the ring segment 12 and the ears 30 and 32 of the ring segment 14 are dimensioned to provide a variable gap $g_1$ and $g_2$ on either side of a centerline or plane $P_1$ extending through the axis 17 (FIG. 4). Accordingly, the ring assembly 10 may be adapted to fit over bell portions of various sizes of pipe fittings while a gap exists between adjacent ears or flanges of the opposed ring segments so that the ring segments may be forcibly clamped to a fitting bell portion, such as the bell portion 72 illustrated by way of example in FIG. 4. Moreover, as further shown in FIG. 4, the configuration of the multi-radii ring parts 16 and 26 is such that when the ring assembly 10 is mounted on a fitting the positions of the lugs 24 and the flanges of the respective ring segments 12 and 14 provide suitable clearance with respect to the reinforced area 88 of the fitting, so that access to the bolt assemblies 22 and 84 may be easily obtained.

Referring now to FIG. 5, there is illustrated how the backup ring assembly 36 is mounted on the bell portion 74 of the fitting 60 in such a way that suitable clearance for the reinforced or filleted area 88 is provided by the multi-radii ring segments 38 while at the same time the ring segments may be forcibly clamped to the circumferential surface 74c of the bell portion 74 or at least drawn together by the bolt assemblies 50 sufficiently to prevent the ring assembly from being displaced past the collar 74a. The circumferential extent of the ring segments 38 is such that the opposed flanges 42 and 44 provide gaps $g_3$ and $g_4$ on either side of a plane $p_2$ passing through the axis 37, which gaps may be variable depending on the diameter of the bell portion to which the ring assembly 36 is clamped. However, a relatively wide range of pipe sizes may be fitted with the ring assemblies 10 and 36, as will be appreciated by those skilled in the art.

Figure 6:
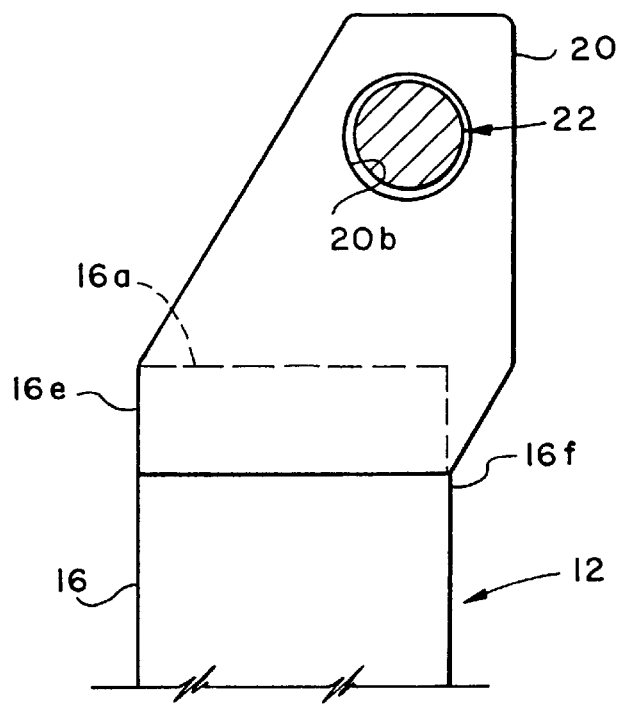
FIG. 6 is a detail section view taken from the line 6—6 of FIG. 4.

Referring now to FIG. 6, there is illustrated, by way of example, the manner in which the flanges or ears 18, 20, 30 and 32 of the ring segments 12 and 14 are offset axially with respect to opposed, generally parallel faces of the ring segments. As shown in FIG. 6, the ring part 16, has opposed parallel faces 16e and 16f which are substantially normal to the axis 17. As shown also in FIG. 6, the flange or ear 20 is offset axially so that a bore 20b for a bolt assembly 22 is closer to the transverse face 16f than the transverse face 16e. When a backup ring assembly 10 is mounted on a bell portion, such as the bell portions 70 and 72, the surface 16e is facing the collar portions 70a and 72a, respectively. By providing the bolt flanges or ears of the ring segments 12 and 14 to be offset away from the ring face which is engageable with the bell collar, a clamping force exerted by the bolt assemblies 22 on the ring segments 12 and 14 will resist a tipping action exerted on the ring assembly as a result of axial forces exerted thereon by the bolt assemblies 84 when the backup ring assemblies are connected to the restraining glands 80 or as a result of axial forces tending to separate the pipe sections 62 or 64 from the fitting 60.

Figure 7:
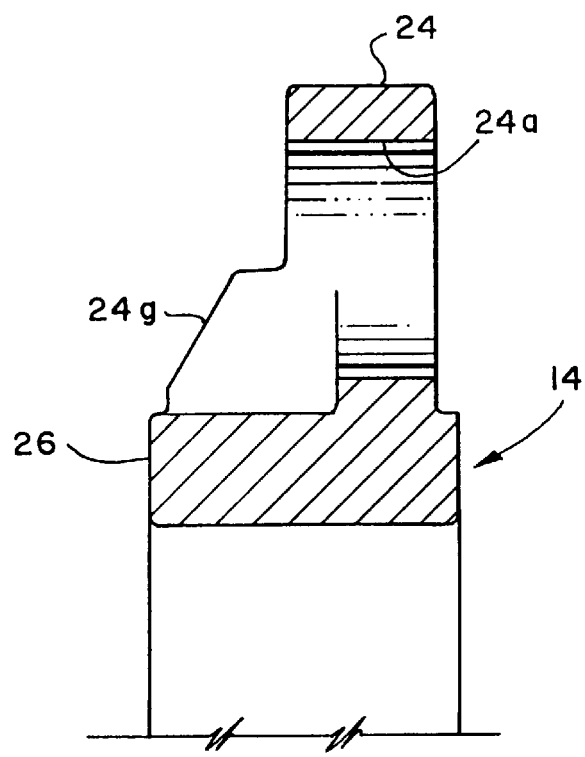
FIG. 7 is a detail section view taken from the line 7—7 of FIG. 4.

Referring to FIG. 7, there is also illustrated the configuration of one of the tie bolt lugs 24 for the ring segment 14. The lug 24 on the ring segment 12 is similarly configured. As shown in FIGS. 1 and 7, an axial bore 24a extends through the lug 24 for receiving a bolt shank of one of the bolt assemblies 84. However, the overall width of the lug 24 is less than the width of the ring segment 14 and the lug 24 is reinforced by spaced apart integral gussets 24g, see FIG. 1 also, whereby the lug is reinforced against forces acting thereon by the bolt assemblies 84 while at the same time the weight of the ring segments 12 and 14 is minimized for larger diameter backup ring assemblies by making the lugs 24 of a width less than the axial width of the rings segments themselves.

Figure 8:
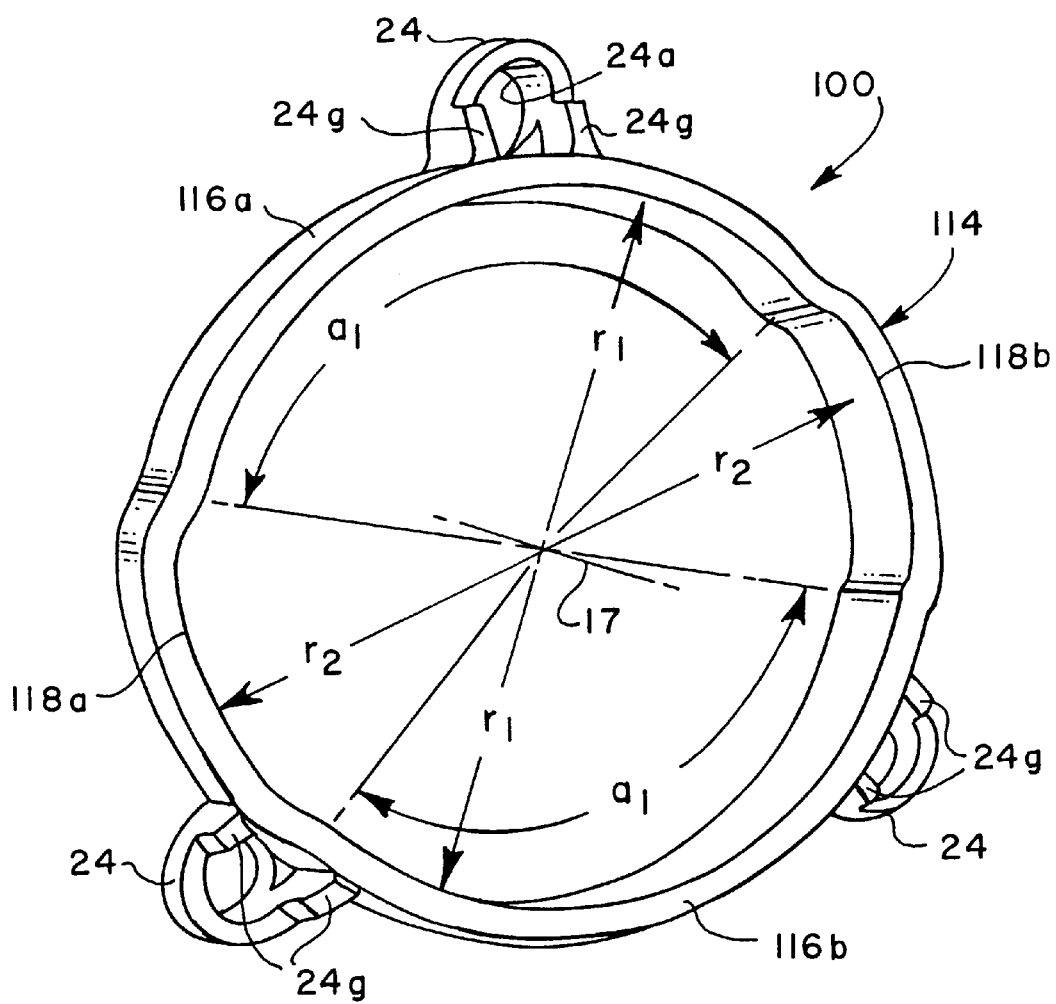
FIG. 8 is a perspective view of a second alternate embodiment of a pipe joint backup ring in accordance with the invention.

Referring now to FIG. 8, there is illustrated a second alternate embodiment of a backup ring in accordance with the invention and generally designated by the numeral 100. The backup ring 100 is a continuous one piece ring part 114 having ring portions 116a and 116b, both portions having an inside surface with a radius $r_1$ with respect to a central axis 17. The continuous ring part 114 is also provided with opposed arcuate ring portions 118a and 118b which are integral and contiguous with the ring portions 116a and 116b, but have an inside surface of radius $r_2$, respectively with respect to the axis 17. The backup ring 110 is shown, by way of example, with three circumferentially equally spaced lugs 24 having a configuration similar to the lugs for the backup ring 10. The circumferential extent of the ring portions 116a and 116b is indicated at arcs $a_1$, thus leaving the ring portions 118a and 118b of substantially equal circumferential extent also. However, the number of ring portions 118a and 118b may be greater than or less than two portions as indicated in FIG. 8 and the circumferential extent of the larger radius ring portions may be more or less than that indicated herein.

The backup ring 100 may be used in applications wherein a pipe fitting is fabricated with the ring in place disposed between a bell portion of the fitting and a branch portion or another bell portion of the fitting. Alternatively, of course, the backup ring 100 may be used with pipe sections having enlarged diameter pipe bell or collar portions formed thereon at only one end of such sections. In any event, the backup ring 100 may be utilized in conjunction with fittings which have reinforcement areas which require clearance as provided by the ring portions 118a or 118b.

Another advantage of the backup rings of the present invention resides in the fact that the rings may also be used with pipe sections and fittings having pipe bell portions thereon which may or may not have reinforcement areas requiring the clearance provided by the enlarged radius ring portions. Accordingly, the backup rings of the present invention may be used in applications requiring extra clearance around the ring as well as applications which do not require the clearance for a reinforcement area since a substantial portion of the backup ring for all embodiments is of the requisite radius to provide suitable engagement with a pipe section bell portion or a fitting bell portion, as the case may be.

As mentioned previously, the backup ring assemblies 10 and 36 and the integral backup ring 100 may be conveniently fabricated of cast metal such as ductile iron or steel. For the backup ring assembly 10, the nominal radial thickness of the ring parts 16 and 26 may be about 0.50 inches and the axial width of the ring parts may be in the range of about 1.0 inches to 1.50 inches. Backup ring assemblies of smaller diameter, such as for the ring assembly 36 may have a radial thickness of the ring parts 40 approximately the same as for the ring parts 16 and 26 and the axial width of the ring segments 38 is also in the range of 1.0 inches to 1.50 inches. The backup ring 100 may be similarly dimensioned.

Although preferred embodiments of a backup ring for pipe joint restraints have been described in detail herein, those skilled in the art will recognize that various substitutions and modifications may be made to the invention without departing from the scope and the spirit of the appended claims.

What is claimed is:

1. A backup ring for a pipe joint restraint comprising: a circumferential ring member consisting of two ring segments, each of said ring segments having an arcuate ring part and means for connecting each ring segment to the other ring segment to form said ring member, and each of said ring segments having multiple inside radii defining inside surfaces thereof wherein a first portion of said ring member provides for engagement of said backup ring with a collar of one of a pipe section and pipe fitting of said pipe joint and wherein a second portion of said ring member provides for clearance between said backup ring and a reinforced area of said one of said pipe section and pipe fitting, and at least one fastener receiving lug is formed on each ring segment for receiving a fastener for securing said backup ring to a restraining member to restrain separation of said pipe joint.

2. The backup ring set forth in claim 1 wherein: said first portion of said ring part extends over at least 50% of the circumferential extent of said ring part.

3. The ring assembly set forth in claim 2 wherein: said ring segments are identical.

4. The backup ring set forth in claim 2 wherein: the circumferential extent of said first portion of said ring part comprises about 50% to 75% of the circumferential extent of said ring part.

5. The backup ring set forth in claim 2 wherein: said first portion of said ring part is disposed between said second portion of said ring part and a third portion of said ring part having the same inside radius as said second portion to provide for clearance between said ring part and a reinforced area of said pipe fitting.

6. The backup ring set forth in claim 1 wherein: each said lug is disposed on said first portion of said ring part.

7. The backup ring set forth in claim 6 wherein: at least one of said ring segments comprises at least two lugs spaced apart on said ring part.

8. The backup ring set forth in claim 1 wherein: said ring segments are identical.

9. The backup ring set forth in claim 1 wherein: said first portion of said ring member extends over at least 50% of the circumferential extent of said backup ring.

10. The backup ring set forth in claim 9 wherein: the circumferential extent of said first portion of said ring member comprises about 50% to 75% of the circumferential extent of said backup ring.

11. A multi-segment circumferential backup ring assembly for a pipe joint restraint comprising: two opposed identical ring segments forming said circumferential ring assembly, each of said ring segments having an arcuate ring part and opposed radially extending ears for receiving respective fastener assemblies for connecting said ring segments to each other to form said ring assembly, said ring segments each having multiple inside radii defining inside surfaces of said ring part wherein a first portion of said ring part provides for engagement of said ring part with a pipe fitting, the circumferential extent of said first portion of said ring part being about 50% to 75% of the circumferential extent of said ring part, and wherein a second portion of said ring part provides for clearance between said ring part and a reinforced area of said pipe fitting.

12. The ring assembly set forth in claim 11 wherein: said first portion of said ring part is disposed between said second portion of said ring part and a third portion of said ring part of larger inside radius to provide clearance for reinforcement areas of said pipe fitting.

13. The ring assembly set forth in claim 11 wherein: said ring segments each include at least one radially projecting lug formed thereon for connecting said ring assembly to a member mounted on a pipe section connected to said fitting.

14. The ring assembly set forth in claim 13 wherein: each said lug is disposed on said first portion of said ring part.

15. A backup ring for a pipe joint restraint comprising: a circumferential ring member having multiple inside radii defining inside surfaces thereof wherein a first portion of said ring member provides for engagement of said backup ring with a collar of one of a pipe section and pipe fitting and wherein a second portion of said ring member provides for clearance between said backup ring and a reinforced area of said one of said pipe section and pipe fitting, said ring member comprises plural ring segments, each of said ring segments having an arcuate ring part and opposed ears on said ring segments, respectively, said ears being provided with bores for receiving threaded fastener assemblies for clamping each of said ring segments to an adjacent ring segment to form a ring member, and at least one of said plural ring segments including said multiple inside radii defining inside surfaces of said ring part wherein a first portion of said ring part provides for engagement of said ring part with said one of a pipe section and pipe fitting and wherein a second portion of said ring part provides for clearance between said ring part and a reinforced area of said one of said pipe section and pipe fitting.

16. The backup ring set forth in claim 15 wherein:

said ears are offset axially with respect to opposed generally parallel faces of said ring part such that said bores are spaced axially closer to one of said faces than the other.

17. The backup ring set forth in claim 15 wherein:

the circumferential extent of said ring part including said ears is less than 180° with respect to a central axis of said multiple inside radii such that said ring segments may be assembled to each other to provide a gap between adjacent ears of adjacent ring segments to accommodate various diameters of pipe fittings to which said ring members are adapted to be clamped.

18. A multi-segment backup ring assembly for a pipe joint restraint comprising:

two opposed ring segments, each of said ring segments having an arcuate ring part and opposed radially extending ears for receiving respective fastener assemblies for connecting said ring segments to each other to form a ring assembly, said ring segments each having multiple inside radii defining inside surfaces of said ring part wherein a first portion of said ring part provides for engagement of said ring part with a pipe fitting, the circumferential extent of said first portion of said ring part being about 50% to 75% of the circumferential extent of said ring part, and wherein a second portion of said ring part provides for clearance between said ring part and a reinforced area of said pipe fitting, said ring segments each include at least one radially projecting lug disposed on said first portion of said ring part for connecting said ring assembly to a member mounted on a pipe section connected to said fitting, and at least one of said ring segments comprises at least two lugs spaced apart on said ring part.

19. A ring segment for a multi-segment backup ring assembly for a pipe joint restraint, wherein said ring assembly comprises at least two ring segments and each said ring segment comprises:

an arcuate ring part and opposed radially projecting ears for receiving respective threaded bolt and nut assemblies for connecting said ring segment to an adjacent ring segment to form said ring assembly, said ring segment further comprising multiple inside radii defining inside surfaces of said ring part wherein a first portion of said ring part provides for engagement of said ring part with a pipe fitting and comprises about 50% to 75% of the circumferential extent of said ring part, and wherein a second portion of said ring part provides for clearance between said ring part and a reinforced area of said pipe fitting, and at least one radially projecting lug formed on said ring segment for connecting said ring assembly to a member mounted on a pipe section connected to said pipe fitting.

20. The ring segment set forth in claim 19 wherein:

the circumferential extent of said ring part including said ears is less than 180° with respect to a central axis of said radii such that plural ones of said ring segments may be assembled to each other to provide a gap between adjacent ears of adjacent ring segments to accommodate pipe fittings of various diameters.

21. A ring segment for a multi-segment backup ring assembly for a pipe joint restraint, wherein said ring assembly comprises at least two ring segments and each said ring segment comprises:

an arcuate ring part and opposed radially projecting ears for receiving respective threaded bolt and nut assemblies for connecting said ring segment to an adjacent ring segment to form said ring assembly, said ears being offset axially with respect to opposed generally parallel faces of said ring part such that respective bores formed in said ears are spaced axially closer to one of said faces than the other, respectively, said ring segment further comprising multiple inside radii defining inside surfaces of said ring part wherein a first portion of said ring part provides for engagement of said ring part with a pipe fitting and comprises about 50% to 75% of the circumferential extent of said ring part, and wherein a second portion of said ring part provides for clearance between said ring part and a reinforced area of said pipe fitting.

22. A backup ring for a pipe joint restraint comprising:

a one piece circumferential ring member having multiple inside radii defining inside surfaces thereof wherein a first portion of said ring member provides for engagement of said backup ring with a collar of one of a pipe section and pipe fitting and wherein a second portion of said ring member provides for clearance between said backup ring and a reinforced area of said one of said pipe section and pipe fitting, said ring member including plural circumferentially spaced radially projecting lugs formed thereon for connecting said ring member to a member mounted on a pipe section connected to said fitting.

* * * * *